UNITED STATES PATENT OFFICE 2,670,382

PRESERVATIVES

Paul M. Downey and Richard O. Zerbe, Nitro, W. Va., assignors to Monsanto Chemical Company, St. Louis, Mo., a corporation of Delaware No Drawing. Application June 10, 1950, Serial No. 167,499

10 Claims. (Cl. 260—609)

This invention relates to a new class of compounds containing sulfur. More particularly the invention relates to a new class of sulfides of monohydric disubstituted phenols. The new products are useful as catalysts for inhibiting oxidation of organic substances which deteriorate by absorption of oxygen and are especially useful for the preservation of a rubber.

It is now known that the number, size, position and kind of substituting group exerts a profound influence on the antioxidant properties of substituted phenol sulfides. Some of these compositions are not rubber antioxidants at all whereas a few have been discovered which are powerful antioxidants having little tendency to discolor rubber. The products of the present invention have been tested and found to comprise a group belonging to this latter class of antioxidants.

The new compounds are sulfides of 3,6-di-substituted phenols in which the substituting groups are linked to the nucleus through primary carbon atoms at least one substituent containing more than one carbon atom. Thus, suitable substituting groups comprise normal alkyl groups and aralkyl groups which are linked to the nucleus through a CH$_2$— group. Examples are benzyl, n-butyl and β-phenethyl groups.

The new compounds form readily in good yield by reaction of the corresponding dialkyl phenol with a sulfur halide. The sulfur chlorides are convenient to use and are readily available for this purpose. Condensation of two molecular equivalents of the phenol with one molecular equivalent of sulfur dichloride produces a mono sulfide or mono thio bisphenol. Additional sulfur may be introduced into the molecule by increasing the ratio of sulfur dichloride or by substituting sulfur mono chloride for sulfur dichloride. While the antioxidant effectiveness is not increased by increasing the sulfur content of the molecule neither is it materially decreased until the sulfur ratio is greater than two atoms of sulfur for two dialkyl phenol radicals. Whether or not a disulfide linkage forms with higher sulfur content is not definitely known but the experimental evidence indicates as more probable that polymers are formed in which more than two phenol groups are linked together by sulfur atoms. Thus, the composite reaction products of either sulfur mono chloride or sulfur dichloride probably contain some polymeric constituents. Where desired these composite reaction products may be used directly as antioxidants without further purification and usually without much sacrifice of antioxidant properties. However, purification of the monosulfides is relatively simple as they are in general crystallizable solids. Higher sulfur ratios tend to accentuate resinous properties and products of various softening points may be obtained by adjustment of this variable. The term "a thio bis(phenol)" is used in a generic sense to include products in which the ratio of the phenol radical to the sulfur atoms is variable including 2:1, 1:1 and even higher sulfur ratios. The point at which the sulfur is attached to the nucleus is not known definitely but it would be expected that 3,6-dialkyl phenols would react first in the para position. If a further sulfur bridge were formed it would be expected to link at the remaining ortho position.

Some of the intermediates are also new compounds. The dialkyl phenols were prepared via the esters, Fries rearrangement to the hydroxy ketones, and subsequent reduction to the phenols by the Clemmensen method.

The esters were prepared by the addition of the appropriate acyl halide to the phenol except in the case of acetates where it was more convenient to use acetic anhydride. Additionally, m-tolyl benzoate was prepared by the Schotten-Baumann reaction. The mixtures were allowed to stand overnight, heated to remove HCl, treated with water and extracted with ethyl ether. The extracts were washed with dilute NaOH, then with water and dried over CaCl$_2$. The crude esters were purified by distillation under reduced pressure. The physical properties of a number of the esters are given in Table I.

The esters were subjected to the Fries reaction. Substantially 1.0 molecular proportion of the ester was mixed with substantially 1.3 mols of powdered anhydrous AlCl$_3$ and heated to 140–150° C. After cooling the reaction mixture was decomposed with ice and dilute HCl. The mixture was permitted to stand overnight, and then extracted with a solvent, the extract washed with water and dried over CaCl$_2$. Where applicable, the crude ketones were steam distilled to separate the steam distillable o-isomer from the p-isomer and the isomers further purified by crystallization, or by distillation under reduced pressure. The physical properties of typical ketones are given in Table II.

For the reduction by the Clemmensen method a mixture was prepared composed of one part ketone, two parts amalgamated zinc, four parts dilute hydrochloric acid and one part ethanol. The mixture was refluxed until reduction was complete, as indicated by the failure of the color reaction with ferric chloride. Toluene was added to the mixture, the toluene solution washed with water, filtered into a Claisen flask and the toluene distilled off until the liquid temperature reached 180° C. The residue was distilled under reduced pressure. The physical properties of typical phenols are given in Table III.

TABLE I

Esters

Ester:
```
m-Tolyl acetate_____B. P. (° C.)/mm__ 212-213/750
mTolyl n-propionate___B. P. (° C.)/mm__ 90-91/5.0
m-Tolyl n-butyrate____B. P. (° C.)/mm__ 99-100/4.0
m-Tolyl isovalerate__B. P. (° C.)/mm__ 85.5-86.0/1.5
m-Tolyl caproate_____B. P. (° C.)/mm__ 105/2.0
m-Tolyl isocaproate__B. P. (° C.)/mm__ 98.5-99.5/1.5
m-Tolyl heptoate_____B. P. (° C.)/mm__ 106-107/1.0
m-Tolyl caprylate_____B. P. (° C.)/mm__ 121/1.5
m-Tolyl caprate_____B. P. (° C.)/mm__ 135-136/1.0
m-Tolyl n-dodecanoate____B. P. (° C.)/mm__ 188/4.0
m-Ethyl phenyl acetate
              B. P. (° C.)/mm__ 225-226/749
m-Ethyl phenyl n-propionate
              B. P. (° C.)/mm__ 97-98/3.5
m-Ethyl phenyl n-butyrate
              B. P. (° C.)/mm__ 89-91/1.0
m-Pentadecyl phenyl acetate_____M. P., degrees__ 39
m-Tolyl benzoate_____M. P., degrees__ 54
o-Tolyl propionate
              B. P. (° C.)/mm__100.5-102.0/11.0
```

TABLE II

Ketones

Ketone:
```
3-methyl-6-acetyl phenol
              B. P. (° C.)/mm__ 102-104/7.5
3-methyl-6-n-propionyl phenol____M. P., degrees__ 43
3-methyl-6-n-butyryl phenol
              B. P. (° C.)/mm__ 114/4.0
3-methyl-6-isovaleryl phenol
              B. P. (° C.)/mm__ 95-97/1.5
3-methyl-6-caproyl phenol
              B. P. (° C.)/mm__ 115-117/1.0
3-methyl-6-isocaproyl phenol
              B. P. (° C.)/mm__ 106-107/1.0
3-methyl-6-n-heptoyl phenol
              B. P. (° C.)/mm__ 123-124/1.0
3-methyl-6-caprylyl phenol
              B. P. (° C.)/mm__ 129-131/1.0
3-methyl-6-capryl phenol
       B. P. (° C.)/mm__ 148-149/1.5 (M. P. 32°)
3-methyl-6-lauryl phenol_____M. P., degrees__ 45-46
3-ethyl-6-acetyl phenol_____B. P. (° C.)/mm__ 97/2.5
3-ethyl-6-propionyl phenol
              B. P. (° C.)/mm__ 116-120/4.0
3-ethyl-6-butyryl phenol
              B. P. (° C.)/mm__ 126-128/4.0
3-n-pentadecyl-6-acetyl phenol
       B. P. (° C.)/mm__ 212-214/2.0 (M. P. 50°)
3-methyl-6-benzoyl phenol_____M. P., degrees__ 64
```

TABLE III

Phenols

```
3-methyl-6-ethyl phenol, B. P. 110-112° C./16 mm. (M. P. 42°).
3-methyl-6-n-propyl phenol, B. P. 121-124° C./15 mm.
3-methyl-6-n-butyl phenol, B. P. 134° C./15 mm.
3-methyl-6-isoamyl phenol, B. P. 104-106° C./2 mm.
3-methyl-6-n-hexyl phenol, B. P. 118-119° C./2.5 mm.
3-methyl-6-isohexyl phenol, B. P. 108-109° C./1.5 mm.
3-methyl-6-n-heptyl phenol, B. P. 126-128° C./2.5 mm.
3-methyl-6-n-octyl phenol, B. P. 141-143° C./3 mm.
3-methyl-6-n-decyl phenol, B. P. 146-147° C./2 mm.
3-methyl-6-n-dodecyl phenol, B. P. 183° C./3 mm. (M. P. 44°).
3,6-diethyl phenol, B. P. 124-126° C./17 mm.
3-ethyl-6-n-propyl phenol, B. P. 131-132° C./15 mm.
3-ethyl-6-n-butyl phenol, B. P. 119-121° C./4 mm.
3-n-pentadecyl-6-ethyl phenol, B. P. 208° C./2.5 mm. (M. P. 63.5°).
3-methyl-6-benzyl phenol, B. P. 138-140° C./1.5 mm. (M. P. 45°).
2-methyl-6-n-propyl phenol, B. P. 105/10 mm.
3-n-propyl-6-ethyl phenol, B. P. 126-127° C./15 mm.
```

As specific embodiments of the invention illustrating in detail the preparation of the new sulfides but without limiting the invention, the following examples are set forth.

EXAMPLE 1

Into a suitable container was charged 35.3 grams (substantially 0.215 molecular proportion) of 3-ethyl-6-n-propyl phenol. The phenol was dissolved in 125 ml. of a petroleum solvent consisting mostly of heptanes and then under vigorous agitation a solution of 12.2 grams (substantially 0.118 molecular proportion) of sulfur dichloride in 60 ml. of the petroleum solvent was added over a period of about 32 minutes. The temperature of the reaction mixture was kept at substantially 25° C. After the addition of the sulfur dichloride was complete the reaction mass was stirred an additional 30 minutes at 25° C. and the precipitated solids then filtered off and washed with fresh solvent. After drying at 60° C. there was obtained 23.9 grams of a tan solid melting at 138-144° C. The crude product was further purified by crystallizing from toluene. A light tan powder was obtained melting at 144.5-147.5° C. Analysis for sulfur gave 8.86% as compared to the calculated value of 8.94% for thio bis(3-ethyl-6-n-propyl phenol).

EXAMPLE 2

Into a vessel of suitable capacity there was charged 33.2 grams (substantially 0.221 molecular proportion) of 3,6-diethyl phenol dissolved in 125 ml. of petroleum solvent consisting mostly of heptanes. Under vigorous agitation there was added a solution of 12.6 grams (substantially 0.122 molecular proportion) of sulfur dichloride dissolved in 60 ml. of the petroleum solvent. The temperature of the reaction mixture was kept at 25° C. during the addition. A vigorous reaction set in immediately as evidenced by precipitation of insolubles and vigorous evolution of hydrogen chloride. After the addition of the sulfur dichloride was complete stirring was continued for an additional 30 minutes at 25° C. The insolubles were filtered off and washed with fresh solvent and then air dried to obtain 27 grams of a light tan powder melting at 136-140° C. The product after further purification by crystallizing from toluene melted at 141-145° C. The sulfur content found by analysis was 9.7%, agreeing exactly with the calculated value of 9.7% for thio bis(3,6-diethyl phenol).

By the same general procedure other members of the new class may be readily prepared. Where desired the reaction may be carried out in other solvents inert to sulfur halides or if desired the solvent may be omitted altogether. Reaction in the absence of a solvent tends to produce resinous, non-crystalline products and this procedure may be resorted to where it is desired to avoid crystallization. Similarly, using a high ratio of sulfur dichloride or replacing sulfur dichloride with sulfur monochloride tends toward resinous, non-crystalline products.

EXAMPLE 3

41.1 grams (substantially 0.231 molecular proportion) of 3-ethyl-6-n-butyl phenol dissolved in 150 ml. of a petroleum solvent consisting mostly of heptanes was charged into a suitable reactor and to this solution there was added under vigorous agitation, a solution of 17.0 grams (substantially 0.127 molecular proportion) of sulfur monochloride dissolved in 75 ml. of the petroleum solvent. The reaction was carried out at 25° C. The viscous reaction mixture was stirred 30 minutes after the addition of the sulfur chloride and the solvent removed by distillation. The residue was a resinous material comprising a thio bis(3-ethyl-6-n-butyl phenol) containing approximately one atom of sulfur for each ethyl butyl phenol radical.

The table below sets forth the physical properties of a number of new mono thio bis-phenols:

TABLE IV

| | M. P., degrees |
|---|---|
| Thio bis(3-methyl-6-ethyl phenol) | 126.5–130 |
| Thio bis(3-methyl-6-n-propyl phenol) | 125.5–129 |
| Thio bis(3-methyl-6-n-butyl phenol) | 98–102 |
| Thio bis(3-methyl-6-isoamyl phenol) | 108–113 |
| Thio bis(3-methyl-6-n-hexyl phenol) | 81–85 |
| Thio bis(3-methyl-6-isohexyl phenol) | 97–99 |
| Thio bis(3-methyl-6-n-heptyl phenol) | 80.5–82 |
| Thio bis(3-methyl-6-n-octyl phenol) | 99–101.5 |
| Thio bis(3-methyl-6-n-decyl phenol) | 77.5–81 |
| Thio bis(3-methyl-6-n-dodecyl phenol) | 78–86 |
| Thio bis(3,6-diethyl phenol) | 141–145 |
| Thio bis(3-ethyl-6-n-propyl phenol) | 144.5–147.5 |
| Thio bis(3-ethyl-6-n-butyl phenol) | 120–121 |
| Thio bis(3-n-pentadecyl-6-ethyl phenol) | 107–111 |
| Thio bis(3-methyl-6-benzyl phenol) | 123–125.5 |

The new phenol sulfides are compatible with elastomers including natural rubber, reclaimed rubber, balata, gutta percha, and synthetically prepared elastomers, as for example GR-S, a copolymer of butadiene and styrene. The antioxidants may be incorporated into a rubber by milling, added to latex before coagulation or applied to the surface of a mass of crude or vulcanized elastomer. The new antioxidants are particularly valuable for the manufacture of white rubber goods since they are essentially free from any tendency to discolor the stock. Amounts within the range of 0.5%–3.0% on the elastomer are preferred but useful results may be achieved by amounts outside this range.

As illustrative of their exceptional antioxidant properties typical examples of the new compounds were incorporated into a rubber stock comprising

| | Parts by weight |
|---|---|
| Smoked sheet rubber | 100 |
| Zinc oxide | 60 |
| Lithopone | 20 |
| Sulfur | 2 |
| Diphenyl guanidine phthalate | 0.675 |
| Benzoyl thio benzothiazole | 0.825 |
| Paraffin | 0.25 |
| Antioxidant | 1.0 |

The rubber stocks so compounded were vulcanized by heating for various periods of time in a press at 126° C. and artificially aged by heating in a bomb under 80 pounds air pressure per square inch for 12 hours at 121° C. The average tensile strength for the various cures before and after aging was determined, the percentage of the original tensile retained after aging being a measure of the antioxidant properties. The ratio of these values to that tensile retained by a stock similarly treated and identical in every respect except that it contained no antioxidant may be taken as a rating of the antioxidant. However, stocks containing no antioxidant are subject to wide variance in tensile after aging. They are much more erratic than a stock containing a good antioxidant consequently the error introduced by a single determination may be considerable. Since the tensile retained after aging by the above described stock containing a standard commercial antioxidant of the phenolic sulfide class was known with considerable precision from a large number of independent determinations carried out over a period of years and in each instance the corresponding value for the blank stock containing no antioxidant had been determined, the rating of the commercial antioxidant could be assigned with considerable confidence by averaging the ratios of the percentage of tensile retained to those of the blank stock for a large number of determinations. In each experiment which included a stock containing one of the new antioxidants there was also included a stock containing the standard commercial antioxidant as well as the blank and the percentage of the original tensile retained after aging was compared to that of the stock containing the commercial antioxidant instead of to the blank. In effect then a figure was obtained which represented the percentage of the commercial antioxidant instead of the percentage of the blank. Knowing from the statistical study the rating of the commercial antioxidant based on the blank as 100 the results were multiplied by this factor to give the rating of the experimental products based on the blank as 100 but without introducing the error inherent in a single determination of the blank. The results are set forth in the table below:

TABLE V

| Antioxidant | Percent Tensile Retained as Compared to Stock Without Antioxidant |
|---|---|
| None | 100 |
| Thio bis(3-methyl-6-ethyl phenol) | 216 |
| Thio bis(3-methyl-6-n-propyl phenol) | 214 |
| Thio bis(3-methyl-6-n-butyl phenol) | 197 |
| Thio bis(3-methyl-6-isoamyl phenol) | 185 |
| Thio bis(3-methyl-6-n-hexyl phenol) | 180 |
| Thio bis(3-methyl-6-isohexyl phenol) | 178 |
| Thio bis(3-methyl-6-n-heptyl phenol) | 189 |
| Thio bis(3-methyl-6-n-octyl phenol) | 192 |
| Thio bis(3-methyl-6-n-decyl phenol) | 203 |
| Thio bis(3-methyl-6-n-dodecyl phenol) | 214 |
| Thio bis(3-methyl-6-benzyl phenol) | 207 |
| Thio bis(3,6-diethyl phenol) | 226 |
| Thio bis(3-ethyl-6-n-propyl phenol) | 214 |
| Thio bis(3-ethyl-6-n-butyl phenol) | 214 |
| Thio bis(3-n-pentadecyl-6-ethyl phenol) | 178 |

Additionally, it was noteworthy that the cured products exhibited substantially no discoloration after 240 hours exposure to a General Electric S-1 lamp.

It will be apparent that modifications can be made in the specific details and embodiments recited above for purposes of illustration. Preparation of the new compounds in an inert solvent has been described but this is unnecessary and direct condensation in the absence of a solvent has been successfully carried out. The new products while primarily intended for the production of rubber may be used with other compositions which deteriorate by absorption of oxygen from the air, as for example mineral oils, vegetable oils, soap, paint and varnish and the like.

What is claimed is:

1. A thio bis(3,6-disubstituted phenol) of the structure

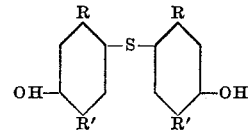

where R represents a normal alkyl group of less than three carbon atoms and R' is selected from the group consisting of normal alkyl radicals of more than one but less than thirteen carbon atoms and benzyl radicals.

2. A thio bis(3,6-disubstituted phenol) of the structure

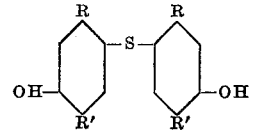

where R is a normal alkyl group containing less than three carbon atoms and R' is a normal alkyl group containing more than one but less than five carbon atoms.

3. A thio bis(3,6-disubstituted phenol) of the structure

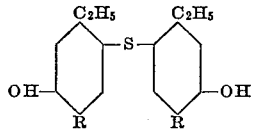

where R is a normal alkyl group containing more than one but less than five carbon atoms.

4. A thio bis(3,6-disubstituted phenol) of the structure

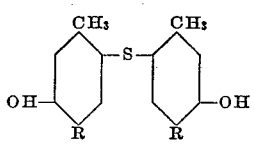

where R is a normal alkyl group containing at least eight but less than twelve carbon atoms.

5. A thio bis(3,6-disubstituted phenol) of the structure

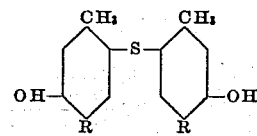

where R is a normal alkyl group containing at least two but not more than four carbon atoms.

6. Thio bis(3-methyl-6-benzyl phenol).
7. Thio bis(3,6-diethyl phenol).
8. Thio bis(3-methyl-6-ethyl phenol).
9. Thio bis(3-methyl-6-n-propyl phenol).
10. Thio bis(3-methyl-6-n-dodecyl phenol).

PAUL M. DOWNEY.
RICHARD O. ZERBE.

References Cited in the file of this patent

UNITED STATES PATENTS

| Number | Name | Date |
|---|---|---|
| 2,364,338 | Beaver | Dec. 5, 1944 |
| 2,374,559 | Morris et al. | Apr. 24, 1945 |
| 2,434,396 | Cook et al. | Jan. 13, 1948 |
| 2,518,379 | Rogers et al. | Aug. 8, 1950 |
| 2,560,049 | Cook | July 10, 1951 |
| 2,581,919 | Albert | Jan. 28, 1952 |